United States Patent [19]

Lorek

[11] Patent Number: 4,596,203

[45] Date of Patent: Jun. 24, 1986

[54] CHECKING DEVICE FOR USE IN HOTEL REFRIGERATORS AND OTHER LOCKABLE SELF-SERVICE APPARATUSES

[75] Inventor: Manfred Lorek, Siegen, Fed. Rep. of Germany

[73] Assignee: Electrolux Siegen GmbH, Siegen, Fed. Rep. of Germany

[21] Appl. No.: 566,146

[22] Filed: Dec. 28, 1983

[30] Foreign Application Priority Data

Jan. 10, 1983 [DE] Fed. Rep. of Germany ....... 3300575

[51] Int. Cl.[4] ........................ G08B 5/00; G01D 11/16

[52] U.S. Cl. ...................................... 116/215; 62/125; 116/294; 340/542

[58] Field of Search ....... 116/294, 215, 311, DIG. 21, 116/73, 80, 100; 340/568, 545, 693, 542, 549, 540, 691; 62/125, 129, 131; 70/432, DIG. 49; 200/61.67, 61.68, 61.64

[56] References Cited

U.S. PATENT DOCUMENTS

| | | | |
|---|---|---|---|
| 1,030,196 | 6/1912 | Lucier | 200/61.68 X |
| 1,131,278 | 3/1915 | Skinner | 200/61.68 X |
| 1,429,306 | 9/1922 | Vining | 116/294 |
| 2,266,086 | 12/1941 | Schlage | 200/61.68 |
| 2,637,801 | 5/1953 | Kelley et al. | 200/61.68 X |
| 2,922,150 | 1/1960 | Jezl | 340/545 X |
| 3,011,163 | 11/1961 | Britt | 340/545 |
| 3,427,835 | 2/1969 | Jeffee | 70/432 |
| 3,611,333 | 10/1971 | Conigliaro | 340/545 X |
| 3,644,920 | 2/1972 | Cartledge | 340/568 |
| 3,653,022 | 3/1972 | Tall | 340/545 |
| 3,893,095 | 7/1975 | DeJong | 340/568 X |
| 4,040,382 | 8/1977 | Sheppard | 116/215 X |
| 4,102,164 | 7/1978 | Barbush | 200/61.67 X |
| 4,196,422 | 4/1980 | Swigert et al. | 340/545 X |
| 4,283,718 | 8/1981 | Butler et al. | 340/545 |
| 4,427,975 | 1/1984 | Kinzie | 340/693 X |
| 4,437,607 | 3/1984 | Negosta | 116/215 X |
| 4,465,997 | 8/1984 | Hines | 340/542 |

*Primary Examiner*—James L. Rowland
*Assistant Examiner*—Thomas J. Mullen, Jr.
*Attorney, Agent, or Firm*—Balogh, Osann, Kramer, Dvorak, Genova & Traub

[57] ABSTRACT

The subject matter of the invention is a checking device for use in hotel refrigerators and other lockable self-service apparatuses. In order to be able to determine simply and quickly whether the apparatuses were opened and, if so, whether any of their contents were removed, an indicator means automatically actuated upon opening of the apparatus is installed in the interior of the apparatus so as to be safeguarded against unauthorized manipulation, the indicator means having an externally visible indicating element. The indicator means may be coupled with the door lock or with the handle of the apparatus and may include a slide which is actuated when the apparatus is opened and mechanically activates the externally visible indicating element.

6 Claims, 3 Drawing Figures

CHECKING DEVICE FOR USE IN HOTEL REFRIGERATORS AND OTHER LOCKABLE SELF-SERVICE APPARATUSES

In a wide variety of gastronomical establishments, especially in hotels, boarding houses or the like, self-service refrigerators containing various beverages and possibly packaged food are available in the rooms to answer the guests' needs for beverages without their hving to call for the attendant personnel. In order to preclude access to the beverages by unauthorized persons such hotel refrigerators are frequently equipped with locks and the refrigerator key is handed to the guest together with his room key. Hence, the contents of the refrigerators can be taken out only by the authorized guest or tenant. After certain time intervals the refrigerators are checked by the hotel personnel, e.g. during the daily clean-up of the rooms, and any consumed articles are replenished. To this end also the authorized hotel personnel carries suitable keys for the refrigerators.

In order to be able to perform this service to the guests' satisfaction it has hitherto been necessary to check each refrigerator at least once a day as to whether any beverages were taken out by the guest. For this purpose each refrigerator door must be opened and its contents must be inspected even if nothing was taken out. This frequently unnecessary inspection is labor and time consuming.

In order to avoid this partially unnecessary expense it has already been proposed to provide marked paper strips which the hotel personnel thread through two eyes and which are supposed to tear when the lock is actuated or when the refrigerator door is opened. However, the insertion and sealing (gluing) of a new strip through the eyes likewise requires some tme and it is possible—and undesirable from the standpoint of the management—that the strips can be glued together again by the guest after he has taken some of the contents out of the refrigerator.

This may have the consequence that regular check and inspection is not performed because the paper strips glued together again give the impression of a completely filled refrigerator, so that the beverages may possibly be put on the bill of the next following guest, though they were missing already on his arrival.

It is the object of the invention to provide a checking device for hotel refrigerators and possibly other self-service apparatuses which indicates whether the apparatus has been opened or used in the meantime.

According to the invention, this problem is solved in that an indicator means automatically actuated by the use of an apparatus is installed in the interior thereof so as to be safeguarded against unauthorized manipulation, and is provided with an externally visible indicating element.

The checking device of the invention has the effect that, when a hotel guest opens the refrigerator, the indicating element provided, for example, at the refrigerator wall or door, is activated and indicates to the personnel that the refrigerator was opened and that the consumed contents must be replenished. This implies a considerable reduction of work because the personnel must open, inspect, and refill only the refrigerators whose indicating elements are activated.

Suitably the indicator means can be coupled with the door lock of the apparatus and may comprise a slide actuatable by the key or by the handle for activation of the externally visible indicating element. The slide may be the switching member of an electrical switch contact and, when moved by the insertion of the key or actuation of the handle, may close an electric circuit which lights up a lamp as indicating element which then remains lit. The required power either can be drawn from the power mains or may be supplied by a commercial battery arranged in the housing of the indicator means and safeguarded against unauthorized removal. If the slide is actuated by the opening motion of the turnable door handle, the checking device of the invention can be used also in all non-lockable hotel refrigerators.

Another suitable embodiment of the invention comprises an indicator means coupled with the respective door hinge and the indicating element, e.g. a light bulb, is electrically connected to the switch of a circuit which is closed when the door is opened and thus causes the bulb to light up and stay lit. It is essential that, after closing of the door, the switch remains closed and thus the signal light remains lit until the switch is opened again by the authorized hotel personnel.

The indicating element may also be a colored marker which moves behind a window in the door wall thus indicating that the apparatus was opened. In case of purely mechanical actuation of the checking device the indicator means can suitably be mounted directly beside the door lock on the inside of the door, and the slide is moved as the key is turned or the handle is turned against the force of a spring, whereby a retainer releases the indicating element designed as a swivel plate so that its colored portion moves into the region of the window in the door.

Hereafter an example of the invention will be described in detail with reference to the drawing in which FIG. 1 shows a closed hotel refrigerator in perspective view;

Figure 1:
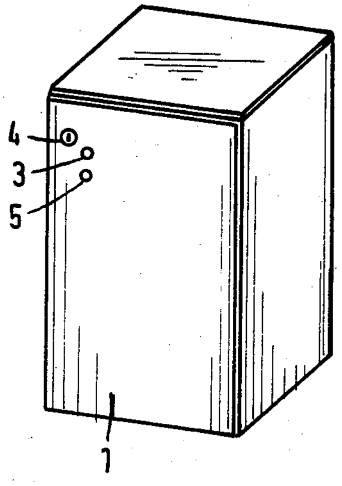

The hotel refrigerator illustrated in FIG. 1 is provided with the checking device fastened to the inside of its door 1; the indicating element designed as a retaining catch 12 becomes visible in a window 5 after the refrigerator was opened by a guest by the insertion of a suitable key into a keyhole 4. After the hotel personnel replenished the consumed refrigerator contents, the indicating element can be moved away from the window 5 by the insertion of a key into a further keyhole 3.

Figure 2:
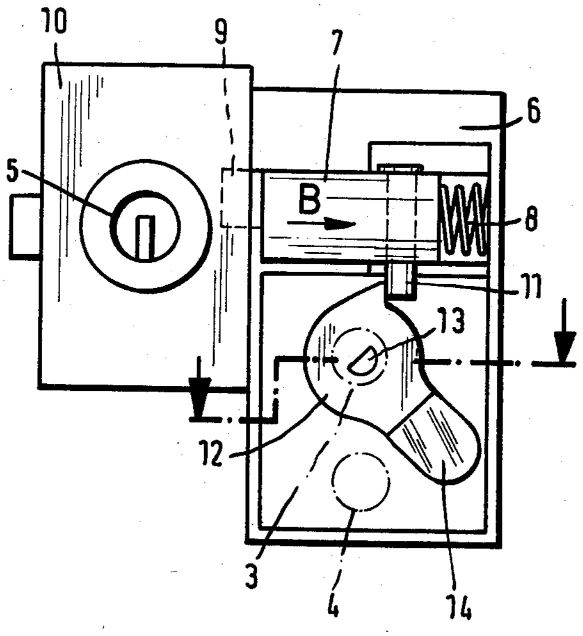
FIG. 2 is a diagrammatic plan view of a checking device adapted to be mounted to the interior wall of a refrigerator door directly adjacent a door lock.

FIG. 2 shows the checking device mounted to the inside of the door 1. In a sturdy plastic housing 6 a slide 7 is arranged so as to be slidable along guides against the force of a spring 8. A lug 9 at the slide, disposed on the left hand side thereof in FIG. 2, extends into the door lock 10 and is shifted in the direction of the arrow B against the force of the spring 8 as a key inserted into the keyhole 4 is turned. Furthermore, in the slide 7 a retainer bolt 11 is seated which, in the illustrated state of operation, forms a stop for the indicating element designed as a retainer catch 12. Said retainer catch 12 in the form of a swivel plate is mounted for co-rotation on an axially fixed pin 13 rotatably supported in the plastic housing 6 and has a colored portion 14 at its smaller end.

Figure 3:
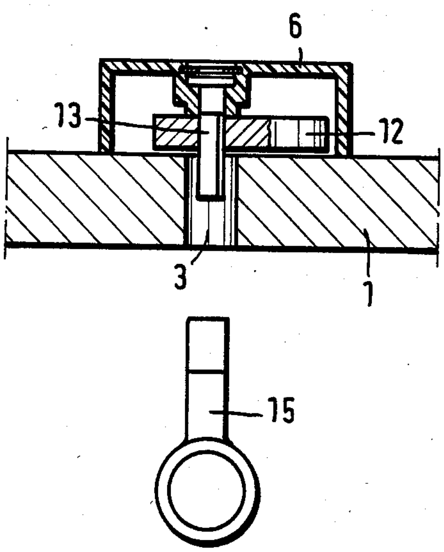
FIG. 3 is a section through the checking device of FIG. 2.

In FIG. 3 the pin 13 supporting the retainer catch 12 is secured in the plastic housing 6 of the checking device. The end of the supporting pin 13, which is disposed below in FIG. 3, extends about halfway into the keyhole 3 with lateral clearance and is designed for receiving a specially shaped key 15.

The above described checking device operates as follows:

When a guest unlocks the door lock 10, the slide 7 is moved to the right against the force of the spring 8 in FIG. 2. The retainer pin 11, which is slidably supported in the slide 7, is thereby disengaged from the nose formed on the retainer catch 12 so that the retainer catch can swivel by gravity about the supporting pin 13 into its vertical position. As a consequence, the colored portion 14 of the retainer catch moves before the glass-covered window. After the guest has closed the refrigerator door, or after he pulled out the key, the slide 7, under the force of the spring 8, moves back to the illustrated position in a direction opposite to that of arrow B. However, since the nose shaped integrally on the retainer catch is no longer in the range of engagement by the pin 11, the retainer catch 12 remains in its vertically suspended position. Only after the insertion of the specially shaped key 15 into the keyhole 3 and turning of the supporting pin 13 is the retainer catch turned out of the region of the window 5 into the position shown in FIG. 2, while the lower end of the pin 11 slidingly received in the slide is vertically shifted along the edge of the retainer catch 12 beyond the nose formed thereon.

The invention is not limited to the illustrated example. Thus, for instance, in lieu of the purely mechanical indicator means also electric indication can be provided; in that case a light bulb or a light conducting rod is arranged as indicating element in the window 5, and by the unlocking operation or by the opening movement of the door a switch is actuated which durably closes the lamp circuit and thus causes the bulb to light up and serve as indicating element. The electric circuit is interrupted, and thus the light is extinguished, only by the hotel personnel by way of a concealed push button or by means of a special key.

A still further embodiment may be used in which the indicating element 12 is reset, or the light is extinguished, by the insertion of a specially designed key into the ordinary keyhole 4. In this case the guest and the hotel personnel have differently designed keys, and this guarantees that, whenever the authorized hotel personnel opens a refrigerator, the indicating element is automatically returned to its initial position so that resetting after replenishment of a refrigerator's contents cannot be forgotten.

I claim:

1. A checking device for use on a movable member such as a door on hotel refrigerators and other lockable self-service apparatuses characterized in that said checking device is provided with an externally visible indicating element which is activated when said apparatus is opened with an apparatus key and is gravitationally biased to remain in the activated state and which indicating element remains in the activated state regardless of subsequent openings of the apparatus until the indicating element is reset to an inactivated initial state by actuation of a setting member by means of a device key.

2. Checking device according to claim 1, characterized in that the indicating element is contained in the interior of a housing so as to be safeguarded against unauthorized manipulation, said housing being coupled with a door lock of the apparatus, that a key-operated slide activates the indicating element only upon initial opening of the apparatus, and the setting member is coupled with the indicating element and is actuatable independently of the door lock.

3. Checking device according to claim 2, characterized in that the slide is movable by the apparatus key against the force of a spring, said slide slidably supporting a retainer for the indicating element.

4. Checking device according to claim 3, characterized in that the retainer is a stop slidably mounted in the slide and engaging a nose on the indicating element designed as a colored retainer catch.

5. Checking device according to claim 1, characterized in that the indicator element can be moved to a non-indicating position only by means of said device key.

6. Checking device according to claim 1, characterized in that the indicator element is accommodated in a plastic housing mounted to the inside of the door of the apparatus directly beside a door lock of the apparatus.

* * * * *